US010940997B2

(12) United States Patent
Ueda

(10) Patent No.: US 10,940,997 B2
(45) Date of Patent: Mar. 9, 2021

(54) MOVEMENT PATH MANAGEMENT SYSTEM, MOVEMENT PATH MANAGEMENT METHOD, AND NON-TRANSITORY COMPUTER-READABLE MEDIUM

(71) Applicant: SATO HOLDINGS KABUSHIKI KAISHA, Tokyo (JP)

(72) Inventor: Yoshiyuki Ueda, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/765,314

(22) PCT Filed: Oct. 3, 2016

(86) PCT No.: PCT/JP2016/079288
§ 371 (c)(1),
(2) Date: Apr. 2, 2018

(87) PCT Pub. No.: WO2017/068950
PCT Pub. Date: Apr. 27, 2017

(65) Prior Publication Data
US 2018/0282063 A1    Oct. 4, 2018

(30) Foreign Application Priority Data

Oct. 23, 2015    (JP) .............................. JP2015-208602

(51) Int. Cl.
*B65G 1/137*    (2006.01)
*G06Q 10/08*    (2012.01)

(52) U.S. Cl.
CPC ......... *B65G 1/1373* (2013.01); *G06Q 10/083* (2013.01)

(58) Field of Classification Search
CPC combination set(s) only.
See application file for complete search history.

(56) References Cited

U.S. PATENT DOCUMENTS

2005/0262132 A1* 11/2005 Morita ................ G06F 21/6218
2006/0184013 A1* 8/2006 Emanuel ................... G01S 5/16
600/426

(Continued)

FOREIGN PATENT DOCUMENTS

JP    2005-350222 A    12/2005
JP    2009-132477 A    6/2009

(Continued)

*Primary Examiner* — Kyle O Logan
(74) *Attorney, Agent, or Firm* — Foley & Lardner LLP

(57) ABSTRACT

A movement path management system includes location information acquiring means configured to automatically acquire location information of object-attached radio communication tags attached to each of a plurality of objects and location information of an operator's radio communication tag attached to an operator; determining means configured to determine a work status using the location information of each of the object-attached radio communication tags and the location information of the operator's radio communication tag acquired by the location information acquiring means; and processing means configured to store time-series data of the location information of the operator's radio communication tag in a memory medium along with information indicating the work status determined by the determining means.

13 Claims, 7 Drawing Sheets

(56) References Cited

U.S. PATENT DOCUMENTS

| | | | |
|---|---|---|---|
| 2007/0021864 A1* | 1/2007 | Mountz | G06Q 10/087 700/216 |
| 2007/0027585 A1* | 2/2007 | Wulff | G01P 13/00 701/1 |
| 2007/0282482 A1* | 12/2007 | Beucher | G06Q 10/08 700/225 |

FOREIGN PATENT DOCUMENTS

| | | |
|---|---|---|
| JP | 2014-52196 A | 3/2014 |
| JP | 2014-84177 A | 5/2014 |

* cited by examiner

MOVEMENT PATH MANAGEMENT SYSTEM, MOVEMENT PATH MANAGEMENT METHOD, AND NON-TRANSITORY COMPUTER-READABLE MEDIUM

TECHNICAL FIELD

The present invention relates to a movement path management system, a movement path management method, and a program.

BACKGROUND ART

In general, in order to improve efficiency of warehousing and shipping operations in a warehouse or the like, a movement path of an operator is analyzed. A technique of acquiring a movement path of an operator is discussed, for example, in JP2014-52196A.

SUMMARY OF INVENTION

However, the movement paths of the operator in the warehousing and shipping operations tend to be different depending on whether or not the operator carries an object. Therefore, even when the acquired movement path is analyzed regardless of a work status, it is difficult to obtain a result with high accuracy.

In view of the aforementioned problems, it is therefore an object of the invention to acquire a movement path of an operator on a work status basis.

According to an aspect of the invention, there is provided a movement path management system including: location information acquiring means configured to automatically acquire location information of object-attached radio communication tags attached to each of a plurality of objects and location information of an operator's radio communication tag attached to an operator; determining means configured to determine a work status using location information of each of the object-attached radio communication tags and the location information of the operator's radio communication tag acquired by the location information acquiring means; and processing means configured to store time-series data of the location information of the operator's radio communication tag in a memory medium along with information indicating the work status determined by the determining means.

According to another aspect of the invention, there is provided a movement path management method including: automatically acquiring location information of object-attached radio communication tags attached to each of a plurality of objects and location information on an operator's radio communication tag attached to an operator; determining a work status using the acquired location information of each of the object-attached radio communication tags and the acquired location information of the operator's radio communication tag; and storing time-series data of the location information of the operator's radio communication tag in a memory medium along with information indicating the determined work status.

According to still another aspect of the invention, there is provided a program executable by a computer of a movement path management system, the program causing the computer to execute: automatically acquiring location information of object-attached radio communication tags attached to each of a plurality of objects and location information on an operator's radio communication tag attached to an operator; determining a work status using the acquired location information of each of the object-attached radio communication tags and the acquired location information of the operator's radio communication tag; and storing time-series data of the location information of the operator's radio communication tag in a memory medium along with information indicating the determined work status.

According to the present invention, the time-series data of the location information of the operator's radio communication tag, that is, the movement path of the operator is stored in the memory medium along with information indicating the work status determined using the location information of each of the object-attached radio communication tags and the location information of the operator's radio communication tag. Therefore, it is possible to acquire the movement path of the operator on a work status basis.

DESCRIPTION OF EMBODIMENTS

A warehousing and shipping management system (hereinafter, referred to as a management system) 100 according to an embodiment of the invention will now be described with reference to the accompanying drawings.

The management system 100 is a system for managing operations such as warehousing and shipping in a logistic warehouse on the basis of location information of an operator's radio communication tag (hereinafter, referred to as an "operator's tag") 10 attached to an operator and location information of an object-attached radio communication tag (hereinafter, referred to as an "object-attached tag") 20 attached to an object 1, that is, on the basis of location information of the operator and location information of the object 1.

The management system 100 can acquire a movement path of an operator and serves as a movement path management system. For this reason, the management system 100 can analyze the acquired movement path to measure work efficiency of the warehousing and shipping operations, or determine a path along which the operator can efficiently move in the warehouse on the basis of an analysis result of the movement path.

Note that "an operator's tag 10 is attached to an operator" means that an operator holds the operator's tag 10 or that an operator's tag 10 is attached to equipment such as a forklift or a bogie used by the operator to carry the object 1.

Figure 1:
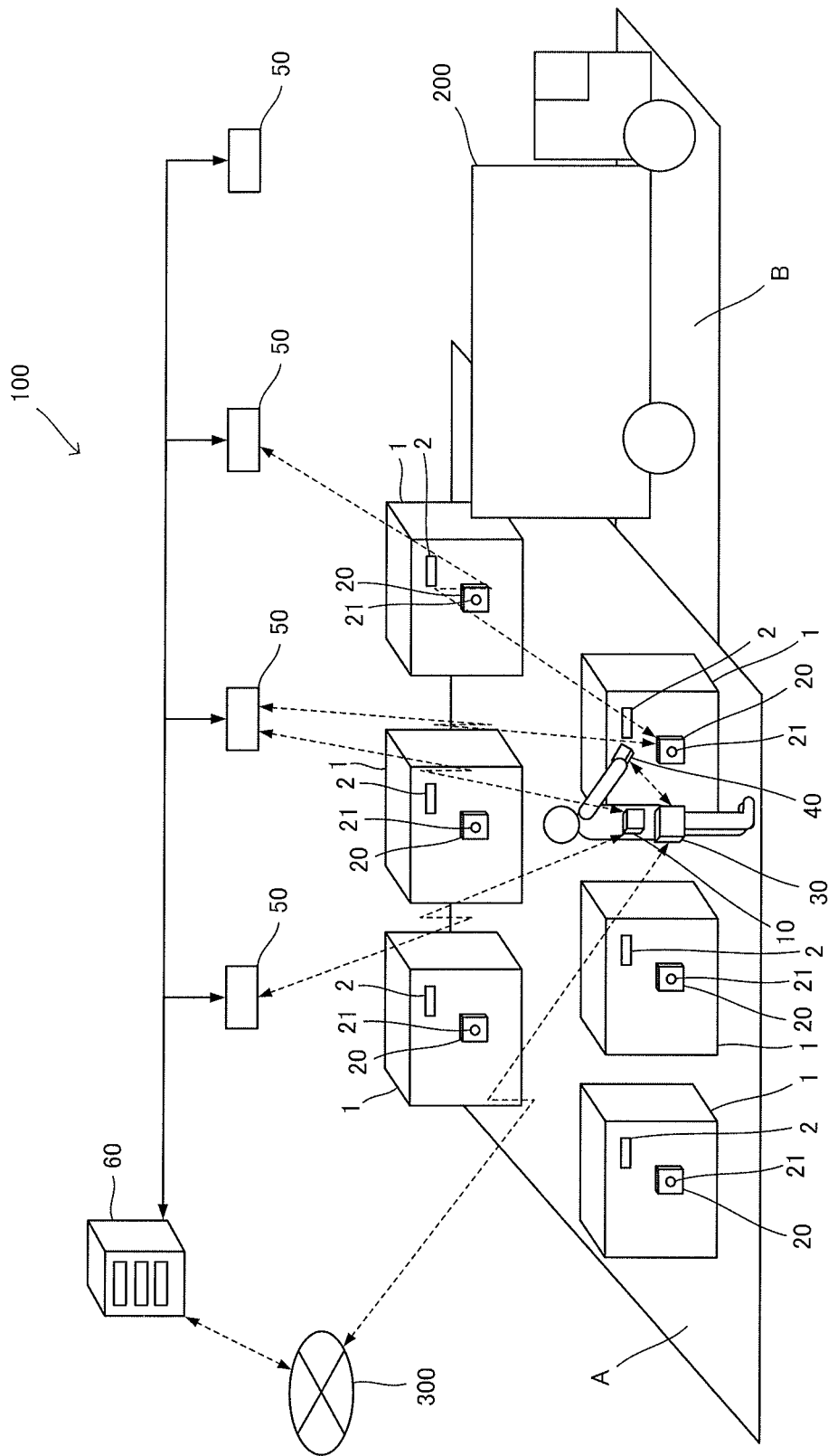
FIG. 1 is a diagram schematically illustrating a warehousing and shipping management system according to an embodiment of the invention.

FIG. 1 is a diagram schematically illustrating the management system 100. In FIG. 1, the operator performs inspection operation for an object 1 placed in an import area A prior to warehousing.

As illustrated in FIG. 1, the management system 100 includes an operator's tag 10 attached to an operator, a portable terminal 30 attached to an operator similarly to the operator's tag 10, an object-attached tag 20 attached to each object 1, a scanner 40 communicatably connected to the portable terminal 30 and used in an inspection operation for the object 1, a plurality of fixed communication units 50 installed in the vicinity of a ceiling of the warehouse, and a computer 60 communicatably connected to the portable terminals 30 and each fixed communication units 50. In addition, the object-attached tag 20 has an LED 21.

When the object 1 is unloaded from an import truck 200 parked at an unloading dock B and is placed in the import area A, the object-attached tag 20 is attached to the object 1 prior to the inspection operation.

The computer 60 and the portable terminal 30 are connected to each other via a network 300 such as the Internet in a wireless manner. In addition, the computer 60 and each fixed communication unit 50 are connected to each other in a wired manner. In addition, the scanner 40 and the portable terminal 30 are connected to each other in a wireless manner. Alternatively, the computer 60 and each fixed communication unit 50 may connected to each other in a wireless manner, and the scanner 40 and the portable terminal 30 may be connected to each other in a wired manner.

The object 1 is attached with a bar code 2 as an optical recognition code. First coded information of the bar code 2 (hereinafter, referred to as "first information") contains information on the object 1 attached with this bar code 2.

The information on the object 1 is information by which a content of the object 1 can be specified, such as, for example, a product name, a part number, and a color. Note that this information may not be directly contained in the first information, but information for specifying the information may be contained in the first information. The object 1 may include various types of articles such as a building material, furniture, a tire, a cardboard box or a container containing an article, and an empty container containing no article.

Figure 2:
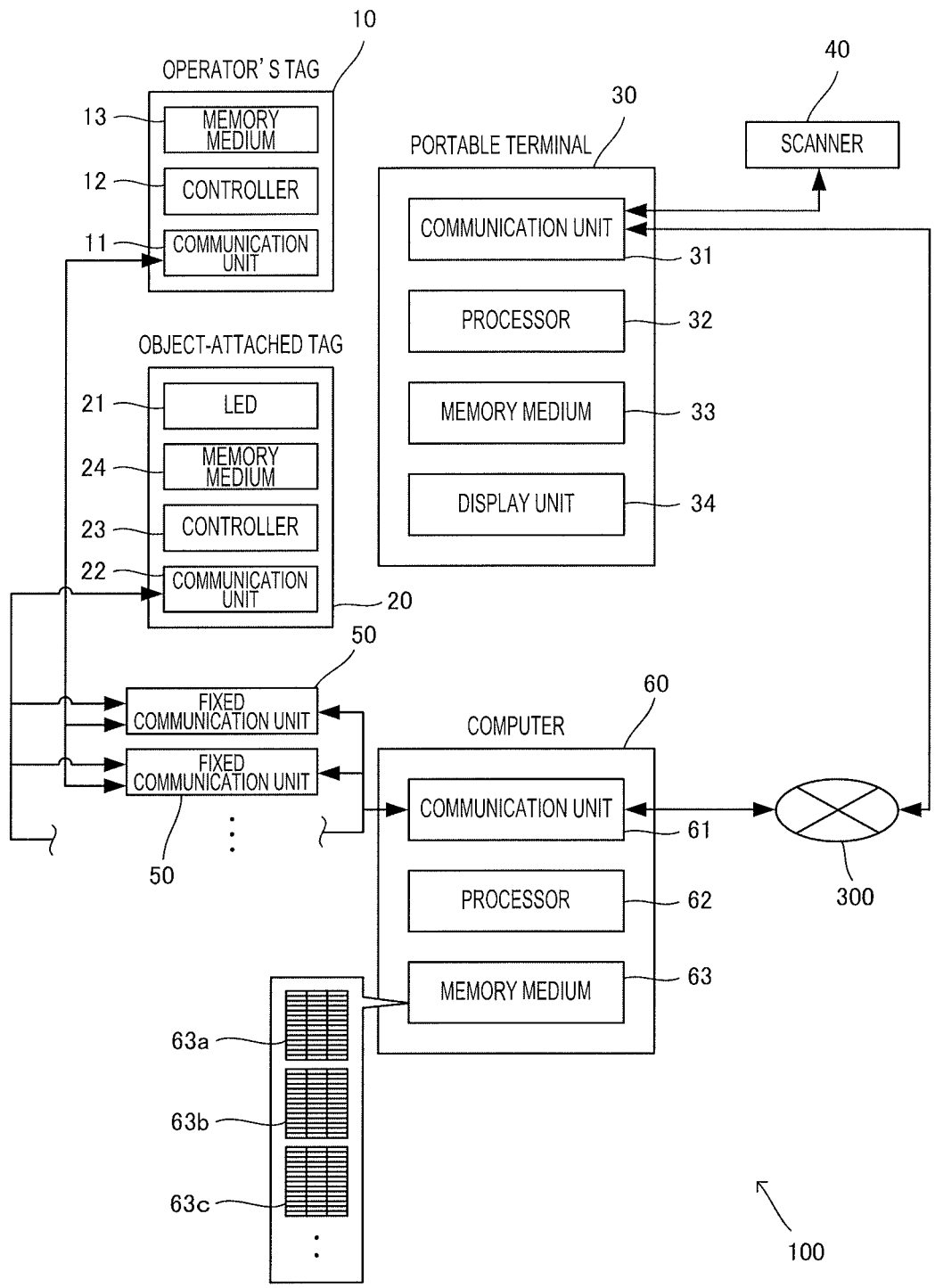
FIG. 2 is a schematic block diagram illustrating the warehousing and shipping management system according to an embodiment of the invention.

FIG. 2 is a schematic block diagram illustrating the management system 100.

As illustrated in FIG. 2, the object-attached tag 20 includes an LED 21, a communication unit 22 for performing radio communication, a controller 23 that controls the operations of the LED 21 and the communication unit 22, and a memory medium 24 in which second coded information (hereinafter, referred to as "second information") is stored. The second information includes an identification number of the object-attached tag 20.

The operator's tag 10 includes a communication unit 11 for performing radio communication, a controller 12 that controls operations of the communication 11, and a memory medium 13 in which third coded information (hereinafter, referred to as "third information") is stored. The third information includes an identification number of the operator's tag 10.

The portable terminal 30 includes a communication unit 31 for performing radio communication, a processor 32 that performs various computation processes, a memory medium 33 that stores various programs or the like, and a display unit 34 that displays various types of information output from the processor 32.

The portable terminal 30 may include, for example, a smart phone, a tablet terminal, a head-mount display terminal, or the like.

The computer 60 includes a communication unit 61 for performing communication, a processor 62 that performs various computation processes, and a memory medium 63 that stores a database for various programs, a database 63a for warehousing data of the object 1, a database 63b for second information of the object-attached tag 20 and third information of the operator's tag 10, a database 63c for information indicating a state of the object 1 stored in the warehouse, a database for various work instruction data such as warehousing instruction data or shipping operation instruction data, and the like.

The warehousing data stored in the database 63a contains first information contained in the bar code 2 attached to the object 1. In addition, various programs or the like stored in the memory medium 63 can be used by the portable terminal 30.

The operator's tag 10 is a tag that can be used in communication based on an ultra wide band (UWB) scheme, and communicates with each fixed communication unit 50 capable of communication based on the similar UWB scheme at all times.

The computer 60 positions a location of the operator's tag 10 on the basis of time for allowing the operator's tag 10 to receive pulse signals transmitted from each of two fixed communication units 50 and return them to each fixed communication unit 50. In this manner, the management system 100 can automatically acquire location information of the operator's tag 10 on the basis of a two-point positioning scheme.

Note that the computer 60 also acquires third information contained in the operator's tag 10 when the location is positioned, and collates the third information with information stored in the database 63b. As a result, the computer 60 recognizes that the tag whose location is positioned is the operator's tag 10.

Similar to the operator's tag 10, the object-attached tag 20 is a tag that can be used in communication based on an ultra wide band (UWB) scheme. Therefore, the management system 100 can also automatically acquire location information of the object-attached tag 20 on the basis of the two-point positioning scheme.

Subsequently, the inspection operation using the management system 100 at the time of importing will be described with reference to FIG. 3.

Figure 3:
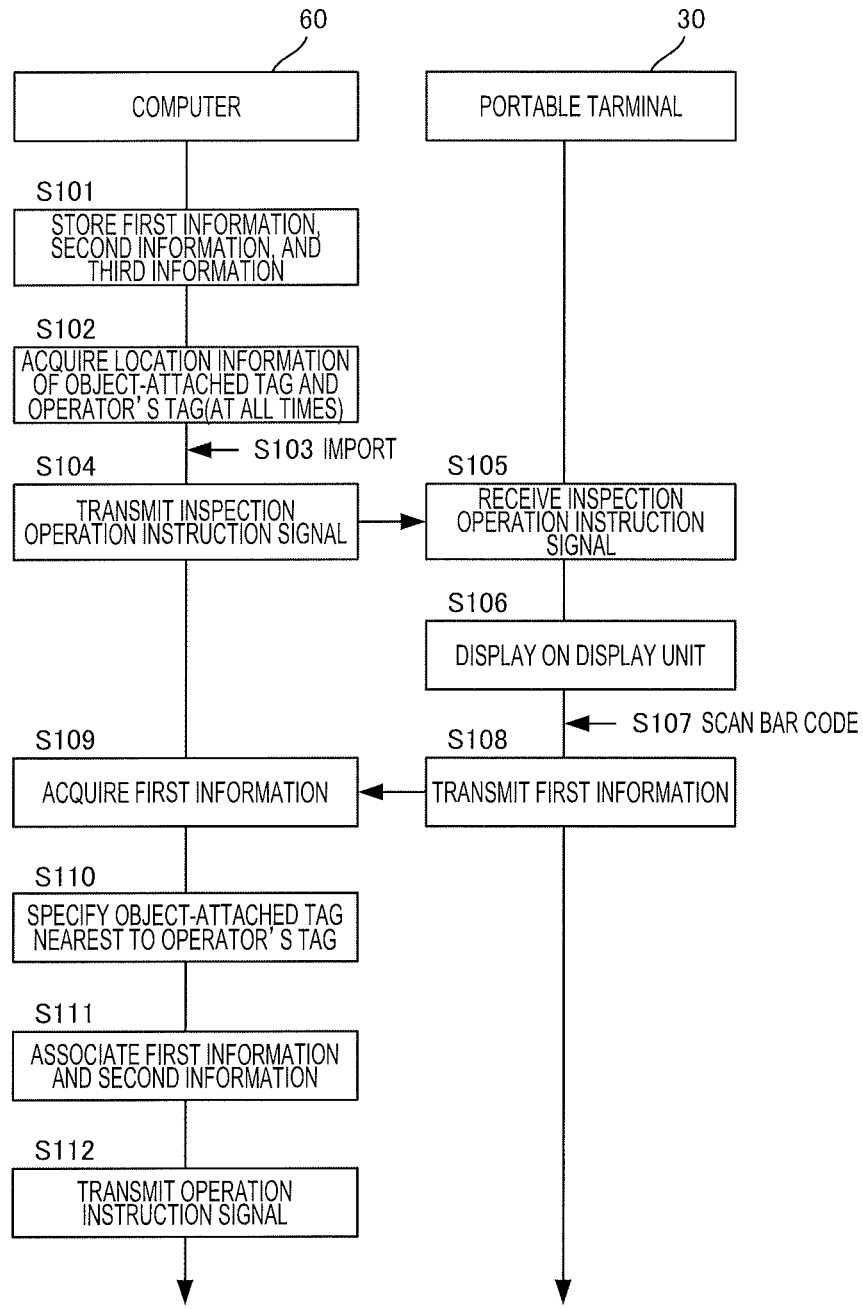
FIG. 3 is a flowchart illustrating an operation sequence of the warehousing and shipping management system at the time of an inspection operation.

FIG. 3 is a flowchart illustrating an operation sequence of the management system 100 at the time of the inspection operation.

As described above, when the object 1 is unloaded from the import truck 200, the object-attached tag 20 is attached to the object 1 prior to the inspection operation. According to this embodiment, any object-attached tag 20 may be attached to any object 1. Therefore, in the course of attaching of the object-attached tag 20 to the object 1, it is difficult to check which object-attached tag 20 is attached to which object 1 using the database of the computer 60.

However, if it cannot be confirmed which object-attached tag 20 is attached to which object 1 using the database, it is difficult to manage various processes using the location information of each object 1.

In this regard, the management system 100 according to this embodiment performs inspection of each imported object 1 by performing the inspection operation on the basis of the flowchart of FIG. 3, and associates the first information corresponding to the bar code 2 attached to each object 1 with the second information corresponding to the object-attached tag 20 attached to each object 1 on the database.

Note that the computer 60 externally acquires warehousing data including the first information before each object 1 is imported to the warehouse, and stores the warehousing data in the database 63a. In addition, the second information contained in the object-attached tag 20 operated in the warehouse and the third information contained in the operator's tag 10 are stored in the database 63b in advance (step S101).

The computer 60 acquires location information of the operator's tag 10 and location information of each object-attached tag 20 at all times (step S102).

As the object 1 is imported into the warehouse (step S103), the computer 60 transmits an inspection operation instruction signal generated on the basis of the warehousing data to the portable terminal 30 (step S104). The content of the inspection operation instruction includes information indicating that the operation is the inspection operation, information regarding each imported object 1, and the like.

As the inspection operation instruction signal is received (step S105), the portable terminal 30 displays work information on the display unit 34 (step S106). As a result, an operator can recognize the work content. When the portable terminal 30 has a loudspeaker, a headphone, or the like, the work content may be notified to the operator by sound.

As the operator scans the bar code 2 attached to the target object 1 using the scanner 40 (step S107), the portable terminal 30 transmits the first information received from the scanner 40 to the computer 60 (step S108).

Alternatively, the scanner 40 and the computer 60 may be connected to each other via the network 300, and the first information may be directly transmitted from the scanner 40 to the computer 60.

As the first information is acquired (received) from the portable terminal 30 (step S109), the computer 60 specifies an object-attached tag 20 nearest to the operator's tag 10 on the basis of the location information of the operator's tag 10 and the location information of each object-attached tag 20 (step S110).

The computer 60 associates second information corresponding to the object-attached tag 20 specified in step S110 out of the second information stored in the database 63b, as the second information corresponding to the object-attached tag 20 attached to the target object 1, with first information matching with the acquired first information out of the first information stored in the database 63a, that is, first information corresponding to the bar code 2 attached to the target object 1 (step S111).

Since a location of the operator's tag 10 acquired when the operator scans the bar code 2 attached to the object 1 using the scanner 40 is very close to a location of the object-attached tag 20 attached to this object 1, it is possible to associate the first information corresponding to the bar code 2 attached to the target object 1 with the second information corresponding to the object-attached tag 20 attached to this object 1 on the database through the aforementioned process.

As a result, when the operator simply scans the bar code 2 attached to the target object 1 using the scanner 40, it is possible to associate the first information with the second information without a cumbersome operation such as an operation of reading the object-attached tag 20 attached to the object 1 using a reader and scanning the bar code 2 attached to the object 1 using the scanner 40, or an operation of manually entering information indicating a relationship between the second information of the object-attached tag 20 and the information regarding the object 1 into the database. Therefore, it is possible to reduce an operator's work burden.

Note that, when the warehousing data stored in the database 63a does not contain the first information matching with that acquired in step S109, the computer 60 determines abnormality in inspection and transmits an error signal to the portable terminal 30.

The computer 60 transmits an operation instruction signal for operating the LED 21 of the object-attached tag 20 corresponding to the second information associated with the first information in step S111 in a specific pattern indicating that the first information is associated, to the object-attached tag 20 via the fixed communication unit 50 (step S112).

As the operation instruction signal is received, the LED 21 of the object-attached tag 20 corresponding to the second information associated with the first information in step S111 is turned on or flickered or the like in a specific pattern indicating that the first information is associated.

As a result, the operator can visually recognize which object-attached tag 20 is associated with the target object 1 in practice. In addition, the operator can also recognize that inspection is normally performed.

As the sequence subsequent to step S107 is executed for all imported objects 1, the inspection operation is terminated.

Subsequently, the warehousing operation using the management system 100 will be described with reference to FIGS. 4 and 5.

Figure 4:
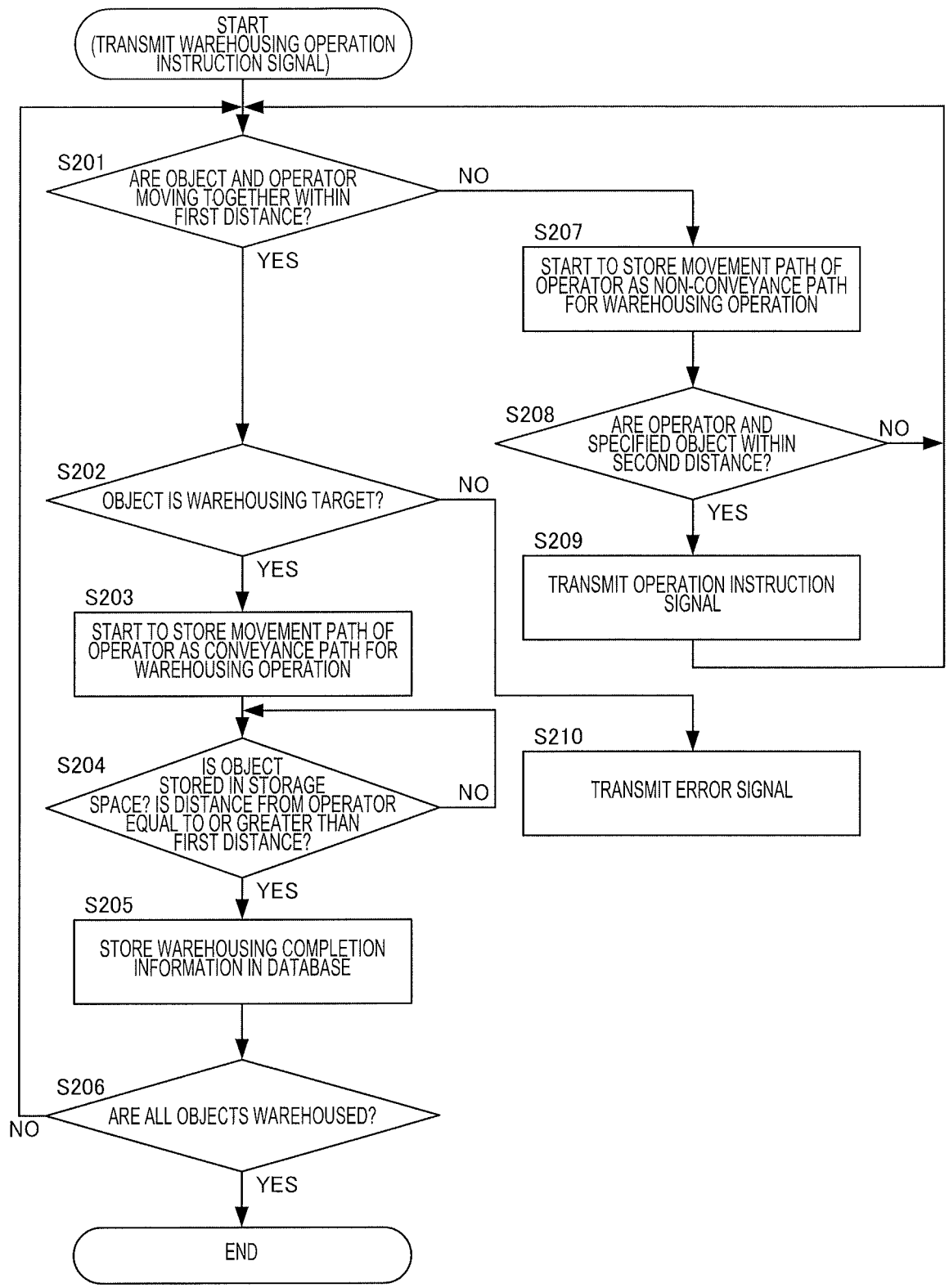
FIG. 4 is a flowchart illustrating a sequence of a warehousing process performed by a computer.

FIG. 4 is a flowchart illustrating a sequence of the warehousing process performed by the computer 60. FIG. 5 is a diagram illustrating a displayed content of the display unit 34.

Figure 5:
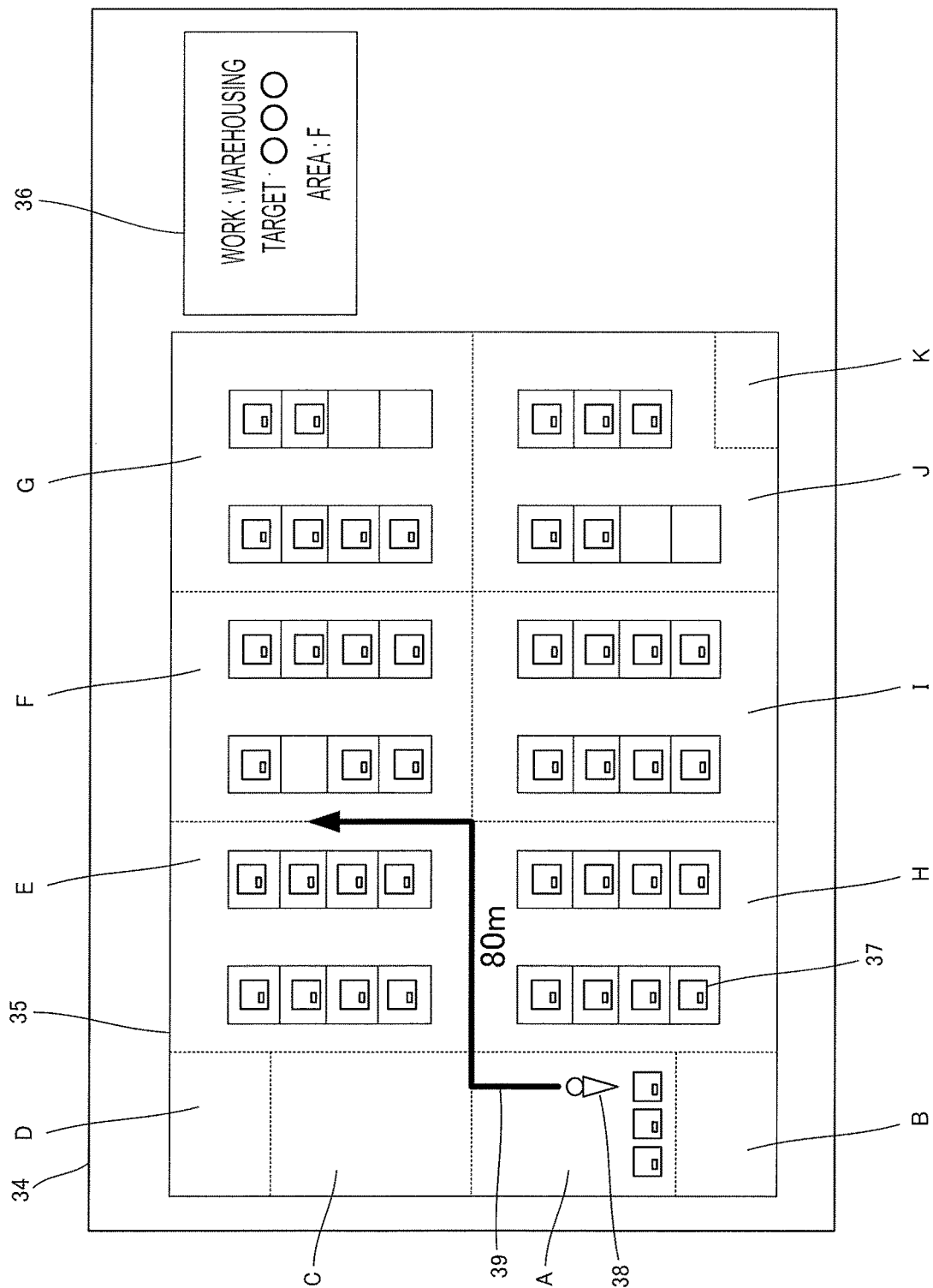
FIG. 5 is a diagram illustrating a displayed content of a display unit.

As illustrated in FIG. 5, a warehouse map 35, work information 36, or the like are displayed on the display unit 34 of the portable terminal 30. In addition, an object mark 37 may be displayed on the warehouse map 35 in a place where the object 1 is stored on the basis of the information stored in the database 63c and the location information of the object-attached tag 20, or an operator mark 38 may be displayed on the warehouse map 35 in a location of the operator on the basis of the location information of the operator's tag 10. In addition, path information 39 and distance information for efficient movement of the operator in the warehouse may also be displayed. Alternatively, the same content as that displayed in the display unit 34 may also be displayed in a monitor (not shown) of the computer 60.

As illustrated in the warehouse map 35 of FIG. 5, the warehouse is sectioned into a plurality of areas. According to this embodiment, the warehouse is sectioned into an import area A where the object 1 unloaded from the import truck 200 is placed, an unloading dock B where the import truck 200 used to import the object 1 into the warehouse is parked, an dispatching area C where an object to be shipped is placed, a loading dock D where an export truck used to export the object 1 from the warehouse is parked, storage areas E to J where the objects 1 are stored, and a treatment area K where treatment for reusing the object-attached tag 20 detached from the object 1 is performed.

The work information 36 displayed on the display unit 34 includes a work content, a work target, and an area where the operator performs the operation. In FIG. 5, the storage area F is displayed as a work area. In addition, path information 39 and distance information to an empty storage space in the storage area F are displayed on the warehouse map 35.

As the aforementioned inspection operation is terminated, the computer 60 specifies an object 1 as a warehousing target on the basis of the warehousing instruction data stored in the database 63c and transmits a warehousing operation instruction signal including work information 36, path information 39 or the like to the portable terminal 30 to start a warehousing process. In the warehousing operation, the operator carries the object 1 specified as a warehousing target from the import area A to an empty storage space of the storage areas E to J.

In step S201, the computer 60 determines whether or not the operator and the object 1 are placed within a first distance as a predetermined distance, and they are moving.

Specifically, the computer 60 determines whether or not the location of the operator's tag 10 and the location of the object-attached tag 20 are within the first distance, and they are moving. The predetermined first distance is set to, for example, "1 m".

If the location of the operator and the location of the object 1 are placed near each other, and they are moving, it is considered that the operator is carrying the object 1. Therefore, in this determination, it can be determined whether or not the operator is carrying the object 1.

If the determination of step S201 is affirmative, the computer 60 advances the process to step S202. Otherwise, if the determination of step S201 is negative, the computer 60 advances the process to step S207. Steps S207 to S209 will be described below.

In step S202, the computer 60 determines whether or not the object 1 that is being carried by the operator corresponds to any one of the warehousing target objects 1.

Specifically, the computer 60 determines whether or not the second information of the object-attached tag 20 attached to the object 1 that is being carried by the operator matches second information corresponding to any one of the objects 1 specified as the warehousing target.

If the determination of step S202 is affirmative, the computer 60 advances the process to step S203. Otherwise, if the determination of step S202 is negative, the computer 60 advances the process to step S210.

If the determination of step S202 is negative, it is considered that the object 1 that is being carried by the operator is not the object 1 specified as the warehousing target. Therefore, in this case, the computer 60 determines that an abnormal operation is performed and transmits an error signal to the portable terminal 30 (step S210).

In step S203, the computer 60 starts to store the movement path of the operator as a conveyance path for a warehousing operation.

Specifically, the computer 60 stores time-series data on the location information of the operator's tag 10 in the database of the memory medium 63 along with the information indicating a work status (conveyance state) determined in step S201 and information indicating that the operation is the warehousing operation. As a result, it is possible to acquire time-series data of the location information of the operator's tag 10 when the operator carries the object 1 during the warehousing operation, that is, the movement path of the operator.

In step S204, the computer 60 determines whether or not the object 1 that is being carried is placed in an empty storage space, and a distance from the operator is equal to or greater than the first distance.

Specifically, the computer 60 determines whether or not the location of the object-attached tag 20 attached to the object 1 that is being carried is placed in an empty storage space, and a distance between the location of the operator's tag 10 and the location of the object-attached tag 20 attached to the object 1 that is being carried is equal to or greater than the first distance.

If the location of the object-attached tag 20 is placed in the empty storage space, and the distance of the operator's tag 10 is equal to or greater than the first distance, it is considered that the operator places the object 1 in the empty storage space and recedes from the object 1, that is, the object 1 is warehoused. Therefore, in this determination, it is possible to determine whether or not the operator warehouses the object 1.

If the determination of step S204 is affirmative, the computer 60 advances the process to step S205. Otherwise, if the determination of step S204 is negative, the computer 60 repeatedly performs the process of step S204.

In step S205, the computer 60 stores warehousing completion information in the database 63c for the object 1 placed in the storage space. Note that the warehousing completion information contains information regarding the storage space where the object 1 is warehoused, and the information on the empty storage space is updated on the database on the basis of the information regarding the storage space where the object 1 is warehoused.

In step S206, the computer 60 determines whether or not the warehousing is completed for all objects 1 specified as the warehousing target by referencing the database 63c.

If the determination of step S206 is affirmative, the computer 60 terminates the warehousing process. Otherwise, if the determination of step S206 is negative, the computer 60 repeatedly performs the process from step S201.

Subsequently, steps S207 to S209 will be described.

In step S207, the computer 60 starts to store the movement path of the operator as a non-conveyance path for a warehousing operation.

Specifically, the computer 60 stores the time-series data of the location information of the operator's tag 10 in the database of the memory medium 63 along with the information indicating the work status (non-conveyance state) determined in step S201 and the information indicating that the operation is the warehousing operation. As a result, it is possible to acquire time-series data of the location information of the operator's tag 10 of the operator who is not carrying the object 1 during the warehousing operation, that is, the movement path of the operator.

In step S208, the computer 60 determines whether or not the operator and any one of the objects 1 specified as the warehousing target are within a second distance.

Specifically, the computer 60 determines whether or not the location of the operator's tag 10 and the location of the object-attached tag 20 attached to any one of the objects 1 specified as the warehousing target are within the second distance. The second distance is set to, for example, "10 m".

If the determination of step S208 is affirmative, the computer 60 advances the process to step S209. In addition, if the determination of step S208 is negative, the computer 60 repeatedly performs the process from step S201.

In step S209, the computer 60 transmits an operation instruction signal for operating the LED 21 of the object-attached tag 20 of the object 1 specified as the warehousing target and placed within the second distance from the operator's tag 10 in a specific pattern indicating that the object 1 is the warehousing target.

As a result, as an operator approaches the object 1 of the warehousing target, the LED 21 of the object 1 is operated in a specific pattern indicating that the object 1 is the warehousing target. Therefore, it is possible to allow the operator to easily specify the warehousing target object 1.

As described above, the computer 60 stores, in the database, the movement path of the operator who carries the object 1 as the conveyance path for the warehousing operation and stores the movement path of the operator who is not carrying the object 1 as the non-conveyance path for the warehousing operation.

Such information is accumulated during the warehousing operation, and is used to determine path information 39 for allowing an operator to efficiently move for the warehousing operation. For example, when the operator carries an object 1, the conveyance path for the warehousing operation is analyzed, and the path information 39 is then determined. When the operator is not carrying an object 1, the non-conveyance path for the warehousing operation is analyzed, and the path information 39 is then determined. As a result, it is possible to determine the path information 39 efficiently depending on a work status.

Note that the aforementioned warehousing process can also be applied to a case where an operator carries a plurality of objects 1 at once.

Subsequently, a shipping operation using the management system 100 will be described with reference to FIG. 6.

Figure 6:
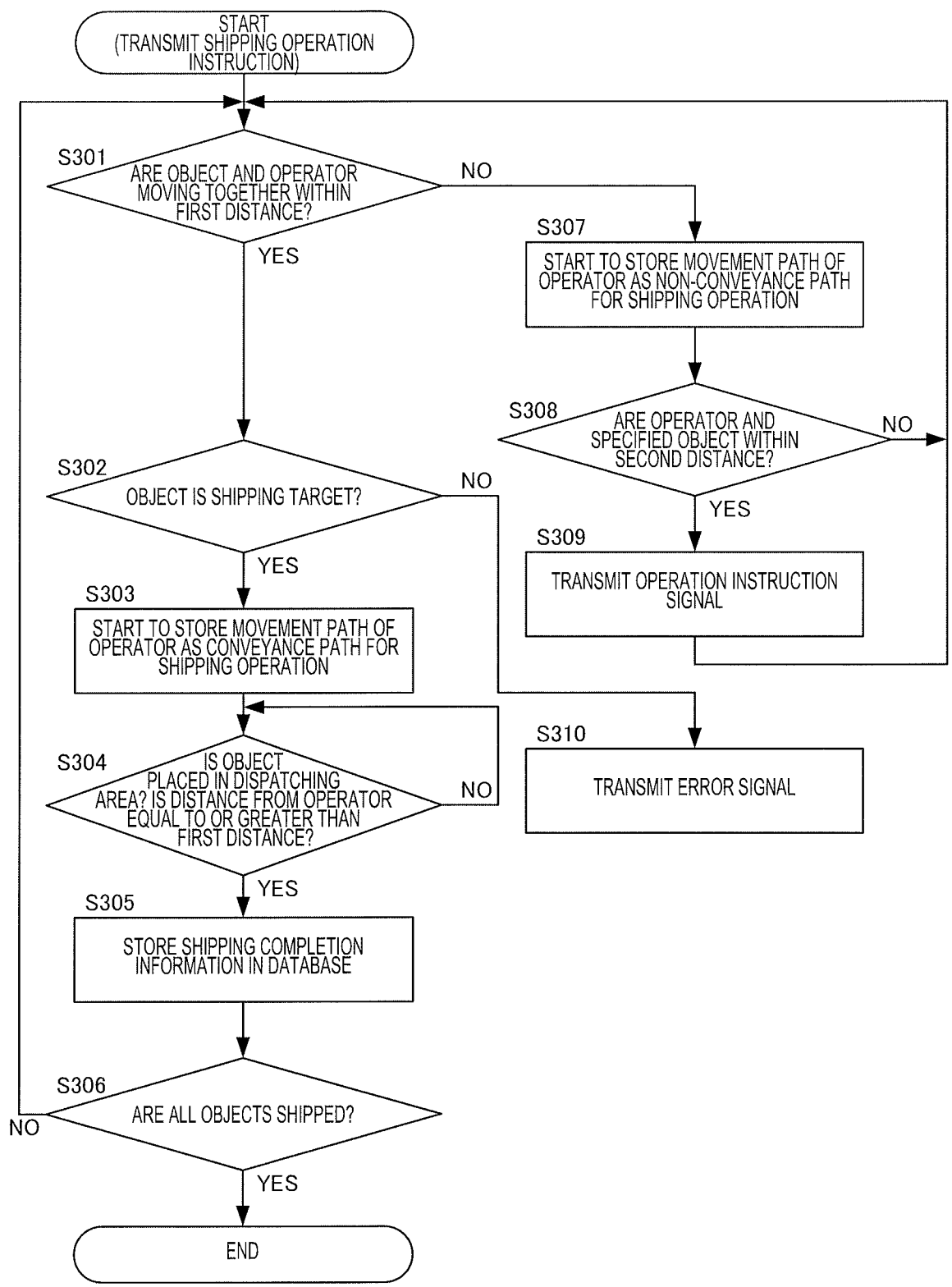
FIG. 6 is a flowchart illustrating a sequence of a shipping process performed by a computer.

FIG. 6 is a flowchart illustrating a sequence of the shipping process performed by the computer 60.

The computer 60 starts a shipping process by specifying a shipping target object 1 on the basis of the shipping instruction data stored in the database 63c and transmitting a shipping operation instruction signal including the work information 36, the path information 39, and the like to the portable terminal 30. In the shipping operation, the operator carries the object 1 specified as the shipping target from a storage space of the storage areas E to J to the dispatching area C.

Similar to the warehousing operation, in the shipping operation, the warehouse map 35, the work information 36, the object mark 37, the operator mark 38, the path information 39, and the like are displayed on the display unit 34 of the portable terminal 30.

In step S301, the computer 60 determines whether or not the operator and the object 1 are placed within a first distance, and they are moving. A specific process is similar to that of step S201 of the warehousing process. Alternatively, instead of the first distance of the warehousing process, a distance different from the first distance may also be employed as the predetermined distance.

If the location of the operator and the location of the object 1 are near, and they are moving, it is considered that the operator is carrying the object 1. Therefore, through the aforementioned process, it is possible to determine whether or not the operator is carrying the object 1.

If the determination of step S301 is affirmative, the computer 60 advances the process to step S302. Otherwise, if the determination of step S301 is negative, the computer 60 advances the process to step S307. Steps S307 to S309 will be described below.

In step S302, the computer 60 determines whether or not the object 1 that is being carried by the operator corresponds to any one of the shipping target objects 1.

Specifically, the computer 60 determines whether or not the second information of the object-attached tag 20 attached to the object 1 that is being carried by the operator matches second information corresponding to any one of the objects 1 specified as the shipping target.

If the determination of step S302 is affirmative, the computer 60 advances the process to step S303. Otherwise, if the determination of step S302 is negative, the computer 60 advances the process to step S310.

If the determination of step S302 is negative, it is considered that the object 1 that is being carried by the operator is not the object 1 specified as the shipping target. Therefore, in this case, the computer 60 determines that an abnormal operation is performed and transmits an error signal to the portable terminal 30 (step S310).

In step S303, the computer 60 starts to store the movement path of the operator as a conveyance path for the shipping operation.

Specifically, the computer 60 stores the time-series data of the location information of the operator's tag 10 in the database of the memory medium 63 along with information indicating the work status (conveyance state) determined in step S301 and information indicating that the operation is the shipping operation. As a result, the time-series data of the location information of the operator's tag 10 of the operator who carries the object 1 during the shipping operation, that is, the movement path of the operator can be acquired.

In step S304, the computer 60 determines whether or not the object 1 that is being carried is placed in the dispatching area C, and the distance from the operator is equal to or greater than the first distance.

Specifically, the computer 60 determines whether or not the location of the object-attached tag 20 attached to the object 1 that is being carried is placed in the dispatching area C, and the distance between the location of the operator's tag 10 and the location of the object-attached tag 20 attached to the object 1 that is being carried is equal to or greater than the first distance.

If the location of the object-attached tag 20 is placed in the dispatching area C, and the distance from the operator's tag 10 is equal to or greater than the first distance, it is considered that the operator places the object 1 in the dispatching area C and recedes from the object 1, that is, the object 1 is shipped. Therefore, through the aforementioned process, it is possible to determine whether or not the operator performs shipping of the object 1.

If the determination of step S304 is affirmative, the computer 60 advances the process to step S305. Otherwise, if the determination of step S304 is negative, the computer 60 repeatedly performs the process of step S304.

In step S305, the computer 60 stores the shipping completion information for the object 1 placed in dispatching area C in the database 63c. In addition, information of the empty storage space is updated in the database on the basis of the shipping completion information.

In step S306, the computer 60 determines whether or not the shipping is completed for all objects 1 specified as the shipping target by referencing the database 63c.

If the determination of step S306 is affirmative, the computer 60 terminates the shipping process. Otherwise, if the determination of step S306 is negative, the computer 60 repeatedly performs the process from step S301.

Subsequently, steps S307 to S309 will be described.

In step S307, the computer 60 starts to store the movement path of the operator as a non-conveyance path for the shipping operation.

Specifically, the computer 60 stores time-series data of the location information of the operator's tag 10 in the database of the memory medium 63 along with the information indicating the work status (non-conveyance state) determined in step S301 and information indicating that the operation is the shipping operation. As a result, the time-series data of the location information of the operator's tag 10 of the operator who is not carrying an object 1 during the shipping operation, that is, the movement path of the operator can be acquired.

In step S308, the computer 60 determines whether or not any one of the objects 1 specified as the shipping target and the operator are within a second distance.

Specifically, the computer 60 determines whether or not the location of the operator's tag 10 and the location of the object-attached tag 20 attached to any one of objects 1 specified as a shipping target are placed within a second distance. Alternatively, instead of the second distance of the warehousing process, a distance different from the second distance may also be employed as the predetermined distance.

If the determination of step S308 is affirmative, the computer 60 advances the process to step S309. In addition, if the determination of step S308 is negative, the computer 60 repeatedly performs the process from step S301.

In step S309, the computer 60 transmits an operation instruction signal for operating the LED 21 of the object-attached tag 20 of the object 1 specified as the shipping target and placed within the second distance from the operator's tag 10 in a specific pattern indicating that the object 1 is the shipping target.

As a result, as the operator approaches the shipping target object 1, the LED 21 of this object 1 is operated in the specific pattern indicating that the object 1 is the shipping target. Therefore, it is possible to allow the operator to easily specify the shipping target object 1.

As described above, the computer 60 stores, in the database, the movement path of the operator who carries an object 1 as a conveyance path for a shipping operation and stores the movement path of the operator who is not carrying the object 1 as a non-conveyance path for a shipping operation.

Such information is accumulated during the shipping operation and is used to determine the path information 39 for allowing an operator to efficiently move during the shipping operation. For example, when the operator carries an object 1, the conveyance path for the shipping operation is analyzed, and the path information 39 is then determined. When the operator is not carrying an object 1, the non-conveyance path for the shipping operation is analyzed, and the path information 39 is then determined. As a result, it is possible to determine the path information 39 efficiently depending on a work status.

Note that the aforementioned shipping process can also be applied to a case where the operator carries a plurality of objects 1 at once.

Subsequently, a dispatching operation using the management system 100 will be described with reference to FIG. 7.

Figure 7:
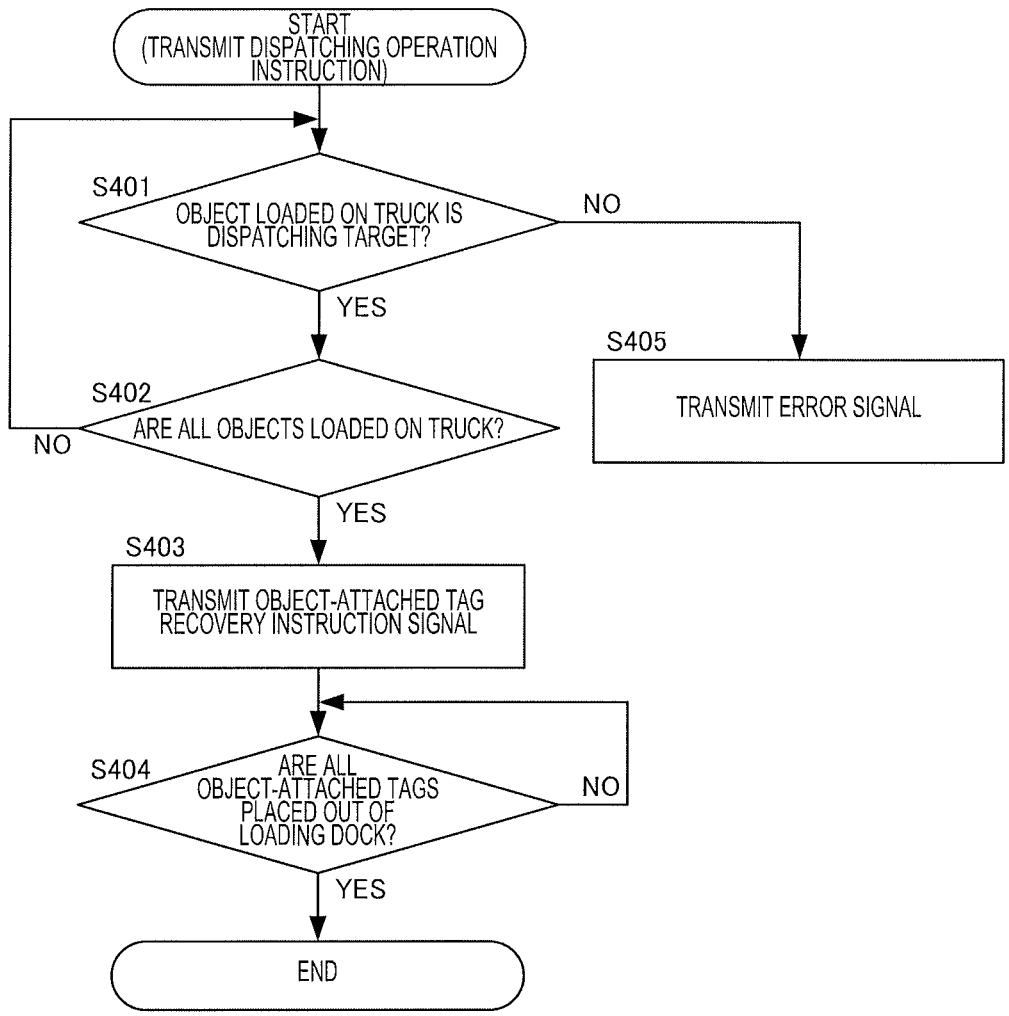
FIG. 7 is a flowchart illustrating a sequence of a dispatching process performed by a computer.

FIG. 7 is a flowchart illustrating a sequence of a dispatching process performed by the computer 60.

As the aforementioned shipping operation is terminated, the computer 60 starts a dispatching process by specifying a dispatching target object 1 on the basis of the dispatching instruction data stored in the database 63c and transmitting a dispatching operation instruction signal including the work information 36 and the like to the portable terminal 30. In the dispatching operation, the operator loads the object 1 specified as the dispatching target from the dispatching area C to the export truck parked at the loading dock D.

Similarly, in the dispatching operation, the warehouse map 35, the work information 36, the object mark 37, the operator mark 38, and the like are displayed on the display unit 34 of the portable terminal 30. Since the dispatching area C and the loading dock D are neighbored to each other, the path information 39 is not displayed. Alternatively, the path information 39 may also be displayed.

In step S401, the computer 60 determines whether or not the object 1 loaded on the export truck is the dispatching target object 1.

Specifically, the computer 60 determines whether or not the second information of the object-attached tag 20 placed in the loading dock D matches second information corresponding to any one of the objects 1 specified as a dispatching target.

If the object-attached tag 20 is placed in the loading dock D where the export truck is parked, it is considered that the object 1 of the object-attached tag 20 is being loaded on the export truck. Therefore, through the aforementioned process, it is possible to determine whether or not the dispatching target object 1 is loaded on the export truck.

If the determination of step S401 is affirmative, the computer 60 advances the process to step S402. Otherwise, if the determination of step S401 is negative, the computer 60 advances the process to step S405.

If the determination of step S401 is negative, it is considered that the object 1 loaded on the export truck is not the object 1 specified as a dispatching target. Therefore, in this case, the computer 60 determines that an abnormal work is performed, and transmits an error signal to the portable terminal 30 (step S405).

In step S402, the computer 60 determines whether or not all of the objects 1 specified as the dispatching target are loaded on the export truck.

Specifically, the computer 60 determines whether or not the second information of each of the object-attached tags 20 placed in the loading dock D matches second information corresponding to any one of the objects 1 specified as the dispatching target.

If the determination of step S402 is affirmative, the computer 60 advances the process to step S403. Otherwise, if the determination of step S402 is negative, the computer 60 repeatedly performs the process from step S401.

In step S403, the computer 60 transmits, to the portable terminal 30, an object-attached tag recovery instruction signal for recovering the object-attached tags 20.

In step S403, the computer 60 determines whether or not all of the object-attached tags 20 are placed out of the loading dock D.

If the determination of step S404 is affirmative, the computer 60 determines that the operator detaches and recovers all of the object-attached tags 20 from the objects 1 loaded on the export truck and terminates the dispatching process. Otherwise, if the determination of step S402 is negative, the computer 60 repeatedly performs the process of step S404.

Meanwhile, the warehouse is sectioned into a plurality of areas as described above. In the treatment area K, a process of reusing the object-attached tags 20 detached from the objects 1 is performed.

Specifically, the computer 60 automatically deletes, from the database, information for associating the second information corresponding to the object-attached tag 20 placed in the treatment area K with the first information.

As a result, the object-attached tag 20 is automatically returned to a reusable state just when the operator brings the object-attached tag 20 detached from the object 1 during the dispatching operation into the treatment area K.

As described above, using the management system 100 as a movement path management system, it is possible to store the time-series data of the location information of the operator's tag 10, that is, the movement path of the operator, in the database of the memory medium 63 along with information indicating the work status determined using the location information of each object-attached tag 20 and the location information of the operator's tag 10.

Specifically, the computer 60 determines the work status as the conveyance state when one of the object-attached tags 20 and the operator's tag 10 are within the first distance from each other and are moving together. When one of the object-attached tags 20 and the operator's tag 10 are not within the first distance from each other or one of the object-attached tags 20 and the operator's tag 10 are not moving together, the work status is determined as the non-conveyance state. In addition, the time-series data of the location information of the operator's tag 10 is stored in the database of the memory medium 63 along with the information indicating the determined work status (conveyance state or non-conveyance state).

As a result, it is possible to acquire the movement path of the operator depending on each work status. Therefore, it is possible to improve accuracy of the analysis result of the movement path.

The computer 60 stores an empty storage space in the database of the memory medium 63 and determines that an operator warehouses an object 1 when the object-attached tag 20 attached to the object 1 determined as having a conveyance state during the warehousing operation is placed in the empty storage space of the object 1, and the distance from the operator's tag 10 is equal to or greater than the first distance.

As a result, it is possible to determine and manage the warehousing operation state even when the operator does not perform a cumbersome work such as scanning the bar code 2 with the scanner 40 every time of the warehousing operation. Therefore, it is possible to reduce an operator's work burden.

In the case of the warehousing operation, the computer 60 stores the time-series data of the operator's tag 10 in the database of the memory medium 63 along with information indicating the determined work status (conveyance state or non-conveyance state) and information indicating that the operation is the warehousing operation. In the case of the shipping operation, the computer 60 stores the time-series data of the operator's tag 10 in the database of the memory medium 63 along with the information indicating the determined work status (conveyance state or non-conveyance state) and information indicating that the operation is the shipping operation.

As a result, it is possible to acquire the movement path of the operator on the basis of the work content as well as the work status. Therefore, it is possible to more improve the accuracy of the analysis result of the movement path.

The computer 60 transmits the operation instruction signal including the path information 39 determined on the basis of the time-series data of the operator's tag 10 acquired on the basis of the work status or the work content, that is, the movement path of the operator, to the portable terminal 30 for delivery to the operator.

As a result, it is possible to provide an operator with path information 39 with excellent efficiency depending on the work status or the work content.

While the embodiment of the present invention has been described hereinbefore, the aforementioned embodiment is just for illustrative purposes to show any one of the applications of the invention, and is not intended to limit the scope of the invention to those described in the embodiment.

For example, although the management system 100 is used in a logistic warehouse by way of example in the aforementioned embodiment, the management system 100 may also be employed, for example, in a market depot, or a hospital warehouse, and the like.

Although the computer 60 executes steps S101, S102, S104, steps subsequent to step S109, the warehousing process of FIG. 4, the shipping process of FIG. 5, and the dispatching process of FIG. 6 in the aforementioned embodiment, some of the processes or steps may be executed by the portable terminal 30 in a distributed manner.

Although the portable terminal 30 and the computer 60 are connected via the network 300 in the aforementioned embodiment, the portable terminal 30 and the computer 60 may also be connected via a wireless router.

The computer 60 may be connected to a cloud server on the Internet, and the processes or steps executed by the computer 60 may also be executed by the cloud server. When the cloud server executes the aforementioned processes or steps, the management system 100 may not have the computer 60. Instead, each device such as the portable terminal 30 may be directly connected to the cloud server via the Internet.

Although the operator's tag 10 and the portable terminal 30 are separately provided in the aforementioned embodiment, they may also be provided in an integrated manner.

Although the bar code 2 is used as the optical recognition code in the aforementioned embodiment, other optical recognition means such as a two-dimensional code or a marker representing information through color transition may also be employed.

Although the object-attached tag 20 has a single LED 21 in the aforementioned embodiment, the number of LEDs may change arbitrarily. In addition, any type of lamps other than the LED may also be employed. A display unit or the like may be used instead of the LED.

Although the object-attached tag 20 is attached to the object 1 in the aforementioned embodiment, the object-attached tag 20 may be attached to a pallet where the object 1 is placed or a container or the like where the object 1 is housed. Even in this case, it is assumed that the object-attached tag 20 is attached to the object 1.

This application claims priority based on Japanese Patent Application No. 2015-208602, filed in the Japan Patent Office on Oct. 23, 2015, the entire contents of which are incorporated herein by reference.

The invention claimed is:

1. A movement path management system comprising:
at least one transceiver configured to automatically acquire location information of object-attached radio communication tags attached to each of a plurality of objects on the basis of communication with the object-attached radio communication tags and location information of an operator's radio communication tag attached to an operator on the basis of communication with the operator's radio communication tag; and
at least one processor configured to
determine work status on the basis of a positional relationship between the object-attached radio communication tags and the operator's radio communication tag and a moving status of the object-attached radio communication tags and the operator's radio communication tag, using each of the location information of the object-attached radio communication tags acquired by the transceiver and the location information of the operator's radio communication tag acquired by the transceiver; and
store, in a memory, the location information of the object-attached radio communication tags acquired by the transceiver, the location information of the operator's radio communication tag acquired by the transceiver, and information indicating the work status determined.

2. The movement path management system according to claim 1, wherein the at least one processor determines that the operator is carrying an object when one of the object-attached radio communication tags and the operator's radio communication tag are within a predetermined distance from each other and are moving together.

3. The movement path management system according to claim 1, wherein the at least one processor determines that the operator is not carrying an object when one of the object-attached radio communication tags and the operator's radio communication tag are not within a predetermined distance from each other or one of the object-attached radio communication tags and the operator's radio communication tag are not moving together.

4. A movement path management system comprising:
at least one transceiver configured to automatically acquire location information of object-attached radio communication tags attached to each of a plurality of objects and location information of an operator's radio communication tag attached to an operator; and
at least one processor configured to
determine a work status using the location information of the object-attached radio communication tags and the location information of the operator's radio communication tag acquired by the transceiver; and
store, in a memory, the location information of the object-attached radio communication tags acquired by the transceiver, the location information of the operator's radio communication tag acquired by the transceiver, and information indicating the work status determined,
wherein the at least one processor stores an empty object storage space in the memory, and
wherein, during a warehousing operation, the at least one processor determines that the operator has warehoused an object when the object-attached radio communication tag attached to the object which was determined by the at least one processor as being carried is located in the empty object storage space and the distance from the operator's radio communication tag is equal to or greater than a predetermined distance.

5. The movement path management system according to claim 4, wherein
the at least one processor stores time-series data of the location information of the operator's radio communication tag in the memory, and
the movement path management system further comprises a transmitter configured to transmit an instruction signal for transmitting path information determined on the basis of the time-series data to the operator.

6. A movement path management system comprising:
at least one transceiver configured to automatically acquire location information of object-attached radio communication tags attached to each of a plurality of objects and location information of an operator's radio communication tag attached to an operator; and
at least one processor configured to
determine a work status using the location information of the object-attached radio communication tags and the location information of the operator's radio communication tag acquired by the transceiver; and
store, in a memory, the location information of the object-attached radio communication tags acquired by the transceiver, the location information of the operator's radio communication tag acquired by the transceiver, and information indicating the work status determined,
wherein the at least one processor stores, in the memory, a dispatching area where a shipped object is placed, and
wherein, during a shipping operation, the at least one processor determines that the operator has shipped the object when the object-attached radio communication tag attached to the object which was determined by the at least one processor as being carried is located in a dispatching area and the distance from the operator's radio communication tag is equal to or greater than a predetermined distance.

7. The movement path management system according to claim 6, wherein
the at least one processor stores time-series data of the location information of the operator's radio communication tag in the memory, and
the movement path management system further comprises a transmitter configured to transmit an instruction signal for transmitting path information determined on the basis of the time-series data to the operator.

8. A movement path management system comprising:
at least one transceiver configured to automatically acquire location information of object-attached radio communication tags attached to each of a plurality of objects and location information of an operator's radio communication tag attached to an operator; and
at least one processor configured to
determine a work status using the location information of the object-attached radio communication tags and the location information of the operator's radio communication tag acquired by the transceiver; and
store, in a memory, the location information of the object-attached radio communication tags acquired by the transceiver, the location information of the operator's radio communication tag acquired by the transceiver, and information indicating the work status determined,
wherein the at least one processor stores time-series data of the location information of the operator's radio communication tag in the memory, and
wherein the movement path management system further comprises a transmitter configured to transmit an instruction signal for transmitting path information determined on the basis of the time-series data to the operator.

9. A movement path management system comprising:
at least one transceiver configured to automatically acquire location information of object-attached radio communication tags attached to each of a plurality of objects and location information of an operator's radio communication tag attached to an operator; and
at least one processor configured to
determine a work status using the location information of the object-attached radio communication tags and the location information of the operator's radio communication tag acquired by the transceiver; and
store, in a memory, the location information of the object-attached radio communication tags acquired by the transceiver, the location information of the operator's radio communication tag acquired by the transceiver, and information indicating the work status determined, wherein the at least one processor determines that the operator is carrying an object when one of the object-attached radio communication tags and the operator's radio communication tag are within a predetermined distance from each other and are moving together, and stores time-series data of the location information of the operator's radio communication tag in the memory, and the movement path management system further comprises a transmitter configured to transmit an instruction signal for transmitting path information determined on the basis of the time-series data to the operator.

10. A movement path management system comprising:

at least one transceiver configured to automatically acquire location information of object-attached radio communication tags attached to each of a plurality of objects and location information of an operator's radio communication tag attached to an operator; and at least one processor configured to determine a work status using the location information of the object-attached radio communication tags and the location information of the operator's radio communication tag acquired by the transceiver; and store, in a memory, the location information of the object-attached radio communication tags acquired by the transceiver, the location information of the operator's radio communication tag acquired by the transceiver, and information indicating the work status determined, wherein the at least one processor determines that the operator is not carrying an object when one of the object-attached radio communication tags and the operator's radio communication tag are not within a predetermined distance from each other or one of the object-attached radio communication tags and the operator's radio communication tag are not moving together, and stores time-series data of the location information of the operator's radio communication tag in the memory, and the movement path management system further comprises a transmitter configured to transmit an instruction signal for transmitting path information determined on the basis of the time-series data to the operator.

11. A movement path management method comprising:

using a transceiver, automatically acquiring location information of object-attached radio communication tags attached to each of a plurality of objects and location information of an operator's radio communication tag attached to an operator;

using at least one processor determining a work status using the acquired location information of the object-attached radio communication tags and the acquired location information of the operator's radio communication tag; and storing, in a memory, the acquired location information of the object-attached radio communication tags, the acquired location information of the operator's radio communication tag, information indicating the determined work status, and time-series data of the location information of the operator's radio communication tag; and using a transmitter, transmitting an instruction signal for transmitting path information determined on the basis of the time-series data to the operator.

12. A non-transitory computer-readable medium storing a program executable by a computer of a movement path management system, the program causing the computer to execute:

using a transceiver, automatically acquiring location information of object-attached radio communication tags attached to each of a plurality of objects and location information of an operator's radio communication tag attached to an operator;

using at least one processor determining a work status using the acquired location information of the object-attached radio communication tags and the acquired location information of the operator's radio communication tag; and storing, in a memory, the acquired location information of the object-attached radio communication tags, the acquired location information of the operator's radio communication tag, information indicating the determined work status, and time-series data of the location information of the operator's radio communication tag; and using a transmitter, transmitting an instruction signal for transmitting path information determined on the basis of the time-series data to the operator.

13. A movement path management system comprising:

at least one transceiver configured to automatically acquire location information of object-attached radio communication tags attached to each of a plurality of objects on the basis of communication with the object-attached radio communication tags and location information of an operator's radio communication tag attached to an operator on the basis of communication with the operator's radio communication tag; and at least one processor configured to determine a work status using the location information of the object-attached radio communication tags and the location information of the operator's radio communication tag acquired by the transceiver; and store, in a memory, the location information of the object-attached radio communication tags acquired by the transceiver, the location information of the operator's radio communication tag acquired by the transceiver, and information indicating the work status determined, wherein the at least one processor associates the location information of an object-attached radio communication tag acquired by the transceiver with an area sectioned in a warehouse, and determines the work status on the basis of the location information of the object-attached radio communication tag in the area of the warehouse and the location information of the operator's radio communication tag.

* * * * *